United States Patent
Chatterjee

(10) Patent No.: US 10,884,909 B1
(45) Date of Patent: Jan. 5, 2021

(54) CODE RELEASE WITH AUTOMATIC CALLBACK

(71) Applicant: INTUIT INC., Mountain View, CA (US)

(72) Inventor: Shreeshankar Chatterjee, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 129 days.

(21) Appl. No.: 16/190,977

(22) Filed: Nov. 14, 2018

(51) Int. Cl.
*G06F 11/36* (2006.01)
*G06F 8/71* (2018.01)
*G06F 8/60* (2018.01)

(52) U.S. Cl.
CPC ............ *G06F 11/3688* (2013.01); *G06F 8/60* (2013.01); *G06F 8/71* (2013.01)

(58) Field of Classification Search
CPC .......... G06F 11/3688; G06F 8/71; G06F 8/60
See application file for complete search history.

(56) References Cited

U.S. PATENT DOCUMENTS

| | | | | |
|---|---|---|---|---|
| 8,601,434 B2* | 12/2013 | De Keukelaere | ... | G06F 11/3684 717/106 |
| 8,677,315 B1* | 3/2014 | Anderson | ............ | G06F 9/4411 717/110 |
| 9,454,351 B2* | 9/2016 | Anderson | ........... | G06F 11/3668 |
| 9,787,779 B2* | 10/2017 | Frank | .................. | G06F 11/3476 |
| 9,898,393 B2* | 2/2018 | Moorthi | ................ | G06F 11/368 |
| 9,965,377 B1* | 5/2018 | Russell | ..................... | G06F 8/71 |
| 10,235,166 B1* | 3/2019 | Barnard | ............. | G06F 11/3616 |
| 10,255,058 B2* | 4/2019 | Frank | .................. | G06F 11/3688 |
| 10,318,285 B1* | 6/2019 | Jodoin | ..................... | G06F 8/60 |
| 10,474,559 B2* | 11/2019 | Moorthi | ............. | G06F 11/3688 |
| 10,514,967 B2* | 12/2019 | McClory | .................. | G06F 8/60 |
| 10,521,284 B2* | 12/2019 | McClory | .............. | G06F 9/5027 |
| 2012/0030516 A1* | 2/2012 | De Keukelaere | ... | G06F 11/3684 714/38.1 |
| 2013/0152047 A1* | 6/2013 | Moorthi | ................ | G06F 11/368 717/124 |
| 2014/0189641 A1* | 7/2014 | Anderson | ................. | G06F 8/71 717/110 |
| 2016/0112475 A1* | 4/2016 | Lawson | .................. | H04L 67/02 709/204 |
| 2017/0180487 A1* | 6/2017 | Frank | .................. | H04L 41/0813 |

(Continued)

OTHER PUBLICATIONS

Adams, Bram, and Shane McIntosh. "Modern release engineering in a nutshell—why researchers should care." 2016 IEEE 23rd international conference on software analysis, evolution, and reengineering (SANER). vol. 5. IEEE, 2016. (Year: 2016).*

*Primary Examiner* — Matthew J Brophy
(74) *Attorney, Agent, or Firm* — DLA Piper LLP (US)

(57) ABSTRACT

A continuous integration and delivery (CID) pipeline may deploy code in a state of incomplete testing to at least one user. While the code is deployed, a callback address manager of at least one processor in communication with the CID pipeline may hand the code off to a simulation manager of the at least one processor. The simulation manager may test the code and generate a score decision based on a result of the testing. The simulation manager may send the score decision to the callback address manager. The callback address manager may modify deployment of the code based on the score decision.

26 Claims, 6 Drawing Sheets

(56) References Cited

U.S. PATENT DOCUMENTS

| | | | |
|---|---|---|---|
| 2017/0255460 A1* | 9/2017 | Frank | G06F 8/65 |
| 2018/0041588 A1* | 2/2018 | Straub | G06F 11/3668 |
| 2018/0196731 A1* | 7/2018 | Moorthi | G06F 11/3664 |
| 2018/0196741 A1* | 7/2018 | Qureshi | G06F 8/70 |
| 2018/0300221 A1* | 10/2018 | Barbee | G06F 11/34 |
| 2018/0321918 A1* | 11/2018 | McClory | H04L 63/0281 |
| 2018/0321993 A1* | 11/2018 | McClory | G06F 8/60 |
| 2018/0322437 A1* | 11/2018 | McClory | G06F 8/41 |
| 2018/0324204 A1* | 11/2018 | McClory | G06F 8/71 |
| 2019/0102279 A1* | 4/2019 | Awan | G06F 8/00 |
| 2019/0129712 A1* | 5/2019 | Hawrylo | G06F 8/71 |
| 2019/0227793 A1* | 7/2019 | Ramasamy | G06Q 10/06398 |
| 2019/0317757 A1* | 10/2019 | Jodoin | G06F 8/60 |
| 2019/0361688 A1* | 11/2019 | Chigakkagari | G06F 8/71 |
| 2019/0384694 A1* | 12/2019 | Ramraz | G06F 11/3612 |
| 2020/0089596 A1* | 3/2020 | Barbee | G06F 11/3006 |
| 2020/0195500 A1* | 6/2020 | Kishen | G06F 9/45558 |

\* cited by examiner

CODE RELEASE WITH AUTOMATIC CALLBACK

DETAILED DESCRIPTION OF SEVERAL EMBODIMENTS

Figure 1:
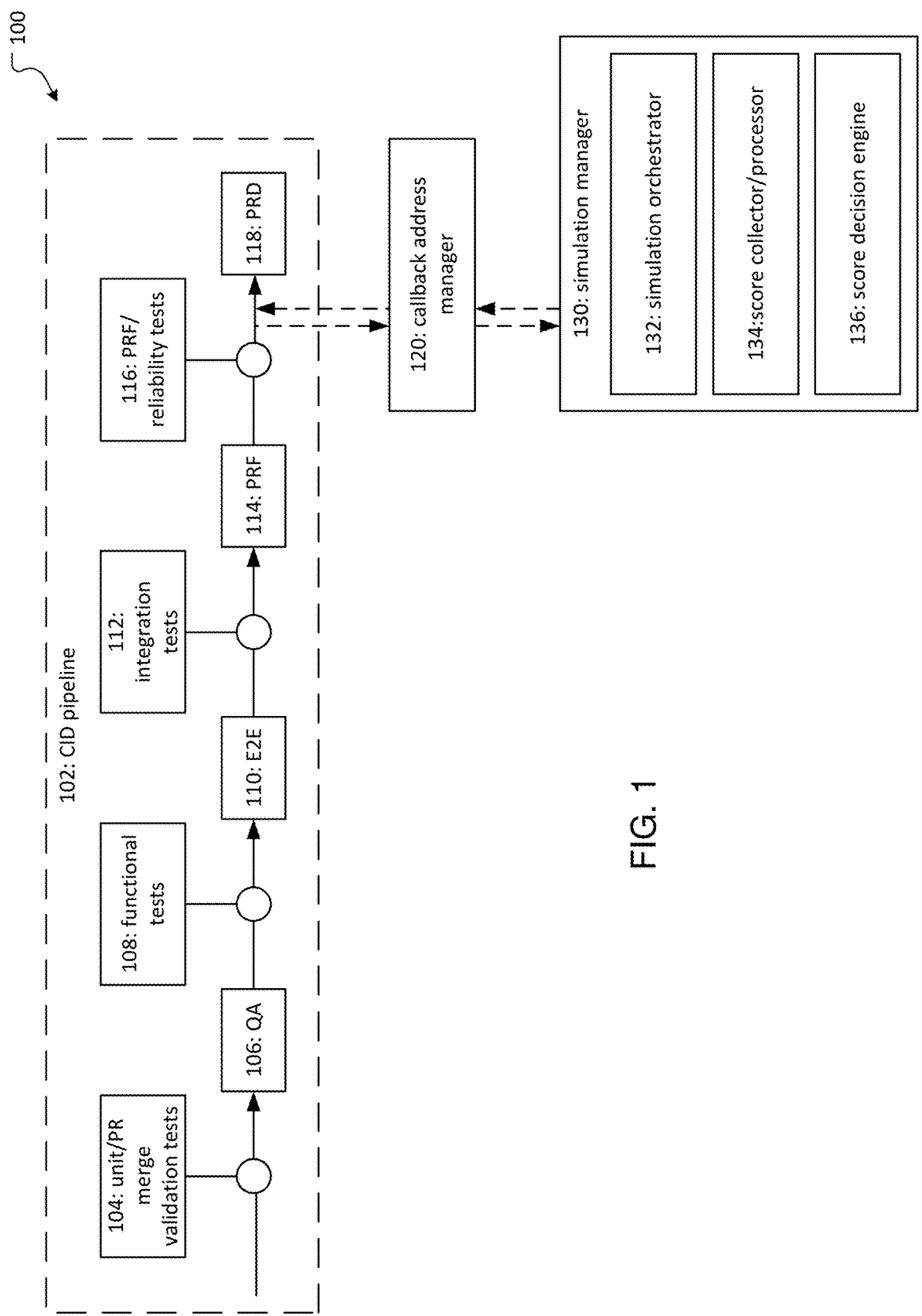
FIG. 1 shows a continuous integration and delivery system according to an embodiment of the present disclosure.

Software developers may use continuous integration and delivery (CID) pipelines to deliver code to web hosting environments and/or other cloud computing platforms. This code may appear in products that are accessed by end users (e.g., online applications, local applications including online components, and/or websites). In many CID pipelines, there may be mandates to complete a product build in a short end-to-end cycle. For example, development may be expected to proceed from code check in to product release (e.g., from build through code testing, packaging, deployment, integration/performance/reliability testing, to promotion) in a short time period, such as 45 minutes or an hour. The CID pipeline may be synchronous, with quality gates between each synchronous step in the pipeline.

For many products, the short time period (e.g., 45 minutes) may leave insufficient time for performing complete code testing and/or integration/performance/reliability testing. These tests may take several hours (e.g., 1-2 hour load testing and/or 4-6 hour endurance testing for performance may be common). To circumvent this problem, the otherwise synchronous CID pipeline may be divided into two separate development lanes, wherein a release build may be deployed in a first lane, while long duration testing may be performed in a second lane.

The two lane development process may decrease end-to-end deployment cycle time, but it may also introduce additional problems. If the code is released without a completed system performance test, users may be exposed to bugs or other performance issues that may be potentially disruptive. If code is tested manually in a war room setting to speed performance testing, this may cause high resource wastage in manual planning, coordination across teams, manual and/or automated pass/fail assessment, multiple parallel computing processes, etc. If code is released incrementally as testing on a small subset of code is completed, this may cause high resource wastage similar to the war room example, and/or may introduce performance issues related to frequent, incremental changes experienced by the users. Moreover, with separate development lanes, the automatic CID system may have no knowledge of performance feedback for the feature code due to manual reconciliation of issues, so any code roll backs may require human intervention and may therefore be time consuming and/or resource intensive.

Embodiments disclosed herein may provide a short end-to-end CID pipeline cycle while limiting and/or eliminating problems associated with skipped testing in a synchronous pipeline and problems associated with two lane development. For example, disclosed embodiments may provide a synchronous CID pipeline with respect to code promotion through the cycle while managing testing in an automated, asynchronous manner without detaching the testing from the CID pipeline. As described in detail below, some embodiments may introduce a callback address manager that may generate a callback address for the active code and a simulation manager that may automatically test the code while it is active. In the event of a problem with the code, the simulation manager may notify the callback address manager, and the callback address manager may use the callback address to automatically implement a rollback of the active code. Alternatively, in the event of code performance testing success, the simulation manager may notify the callback address manager, and the callback address manager may permit an increased release footprint for the code. Accordingly, the disclosed embodiments may provide reliable, self-service, automated code evaluation that may use simulated and/or real world data to automatically implement rollback or code approval without decoupling from a CID pipeline, while maintaining high speed CID production cycles. The disclosed embodiments may reduce false negative testing problems by providing for automatic rollback of buggy or poor performing features. The disclosed embodiments may also reduce false positive testing problems by enabling automatic, thorough review of high risk code in spite of a short development cycle.

FIG. 1 shows a CID system 100 according to an embodiment of the present disclosure. System 100 may include CID pipeline 102, callback address manager 120, and/or simulation manager 130. Pipeline 102 may perform software development and release processing, while callback address manager 120 and/or simulation manager 130 may perform code testing and release rollback and/or expansion processing.

Pipeline 102 may include a series of quality gates and promotion points, wherein code may be promoted to promotion points by passing through quality gates in a synchronous manner. For example, as a first quality gate, one or more static analysis tests 104 (e.g., code unit and/or pull request merge validation tests) may be performed to determine whether one or more code units created and/or modified by one or more developer users are merged together correctly. If the code passes the static analysis tests 104, it may be promoted to a quality assurance (QA) stage 106. As a next quality gate, one or more functional tests 108 may be performed to determine whether the code works and/or to detect bugs. If the code passes the functional tests 108, it may be promoted to an end to end (E2E) stage 110. As a next quality gate, one or more integration tests 112 may be performed to determine whether the code integrates with other portions of code for the product for which the code has been developed. If the code passes the integration tests 112, it may be promoted to a performance stage 114. As a final quality gate, one or more performance and/or reliability tests 116 may be performed to determine whether the code causes any performance related issues or bugs (e.g., whether the code is unacceptably slow). If the code passes the performance and/or reliability tests 116, it may be promoted to a production stage 118. As those of ordinary skill in the art will appreciate, specific tests performed at each quality gate may vary depending on the type of code being evaluated, and any existing or newly developed code quality tests may be employed within pipeline 102

In order to meet short (e.g., 45 minute) end-to-end CID cycle requirements, at least one of the quality gates may perform a reduced set of tests compared with a battery of tests that may be performed for CID cycles that have no time requirements. For example, rather than performing extensive, multi-hour performance and/or reliability tests such as those referenced above, pipeline 102 may subject the code to short (e.g., 10 or 15 minute) performance and/or reliability tests 116. These tests may establish whether the code meets minimally acceptable performance and/or reliability requirements, but they may be insufficient to detect some existing performance and/or reliability issues in some cases.

In spite of the minimal performance and/or reliability testing 116, the code may be available to end users of the product for which the code was developed at production stage 118. In some embodiments, the code may initially be available only to a limited set of users. However, even if this is the case, the set of users accessing the code may be negatively affected by performance and/or reliability issues if they are not addressed. Accordingly, system 100 may include asynchronous processing components to perform full performance and/or reliability testing outside of the synchronous pipeline 102.

The asynchronous processing components may include callback address manager 120 and simulation manager 130, for example. As a component of CID system 100, callback address manager 120 may have full access to CID pipeline 102 states (e.g., current and/or past) and/or any related CID configuration or execution results/metadata stores. As described with respect to FIG. 3 below, callback address manager 120 may establish a rollback point for code in production stage 118, listen for results of testing by simulation manager 130, and authorize either rollback of the code or full deployment of the code based on the results. As described with respect to FIG. 4 below, simulation manager 130 may perform thorough performance and/or reliability testing using simulated input data and/or real world input data developed by the code in production and report on the results of the testing to callback address manager 120. Specifically, in some embodiments, simulation manager 130 may include simulation orchestrator 132 which may define simulation and/or result requirements, score collector/processor 134 which may gather data for testing and perform the testing, and/or score decision engine 136 which may determine and/or report the score.

One or more elements of system 100 may be provided by one or more physical or virtual computing devices, such as computing device 200 described with respect to FIG. 2 below. Some or all system 100 elements may communicate with other computing devices using one or more networks, such as the Internet (for example, code may be pushed to production through a web server that delivers the code to clients through the Internet). In some embodiments, all components of system 100 may be hardware and/or software elements of a single computing device. In other embodiments, one or more of pipeline 102, callback address manager 120, and/or simulation manager 130 may be provided by different computing devices that may be in communication with one another through the one or more networks. In other embodiments, at least one of pipeline 102, callback address manager 120, and/or simulation manager 130 may be provided by a plurality of separate real or virtual computing devices working together (e.g., in a mesh network or client/server arrangement).

Figure 2:
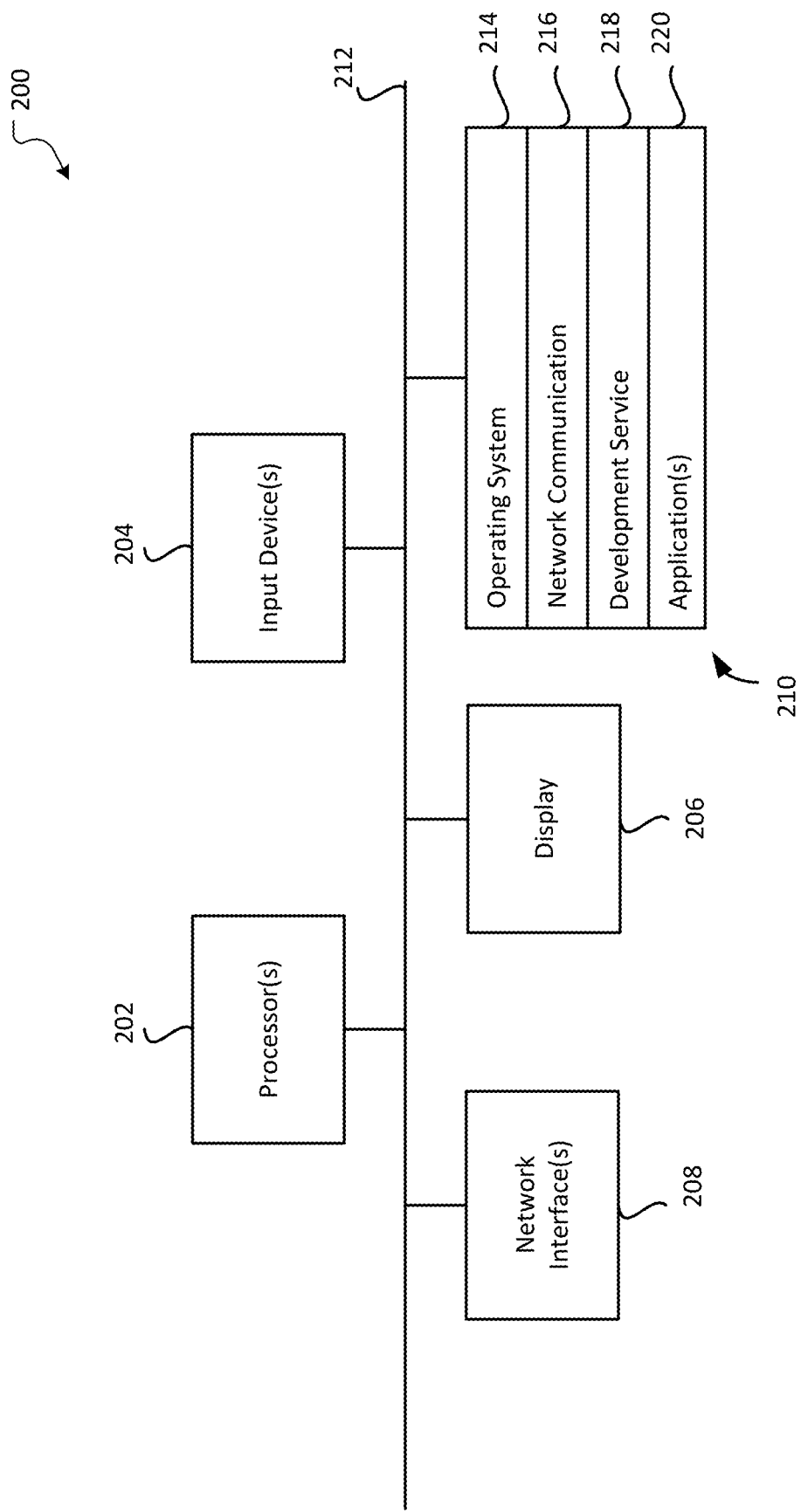
FIG. 2 shows a computing device according to an embodiment of the present disclosure.

FIG. 2 shows a computing device 200 according to an embodiment of the present disclosure. Computing device 200, or multiple instances of computing device 200, may provide pipeline 102, callback address manager 120, and/or simulation manager 130 as noted above. Accordingly, computing device 200 may be configured to provide various features and perform various processes as described herein. Computing device 200 may be implemented on any electronic device that runs software applications derived from instructions, including without limitation personal computers, servers, smart phones, media players, electronic tablets, game consoles, email devices, etc. In some implementations, computing device 200 may include one or more processors 202, one or more input devices 204, one or more display devices 206, one or more network interfaces 208, and one or more computer-readable mediums 210. Each of these components may be coupled by bus 212, and in some embodiments, these components may be distributed across multiple physical locations and coupled by a network.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Development service instructions 218 may include instructions that perform the CID pipeline processing described above and/or the callback address management processing and simulation management processing described below. In some embodiments, system 100 may include a plurality of computing devices 200, and different computing devices 200 may perform different subsets of the CID pipeline processing, callback address management processing, and simulation management processing using different portions of development service instructions 218.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other, or by processes running on the same device and/or device cluster, with the processes having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
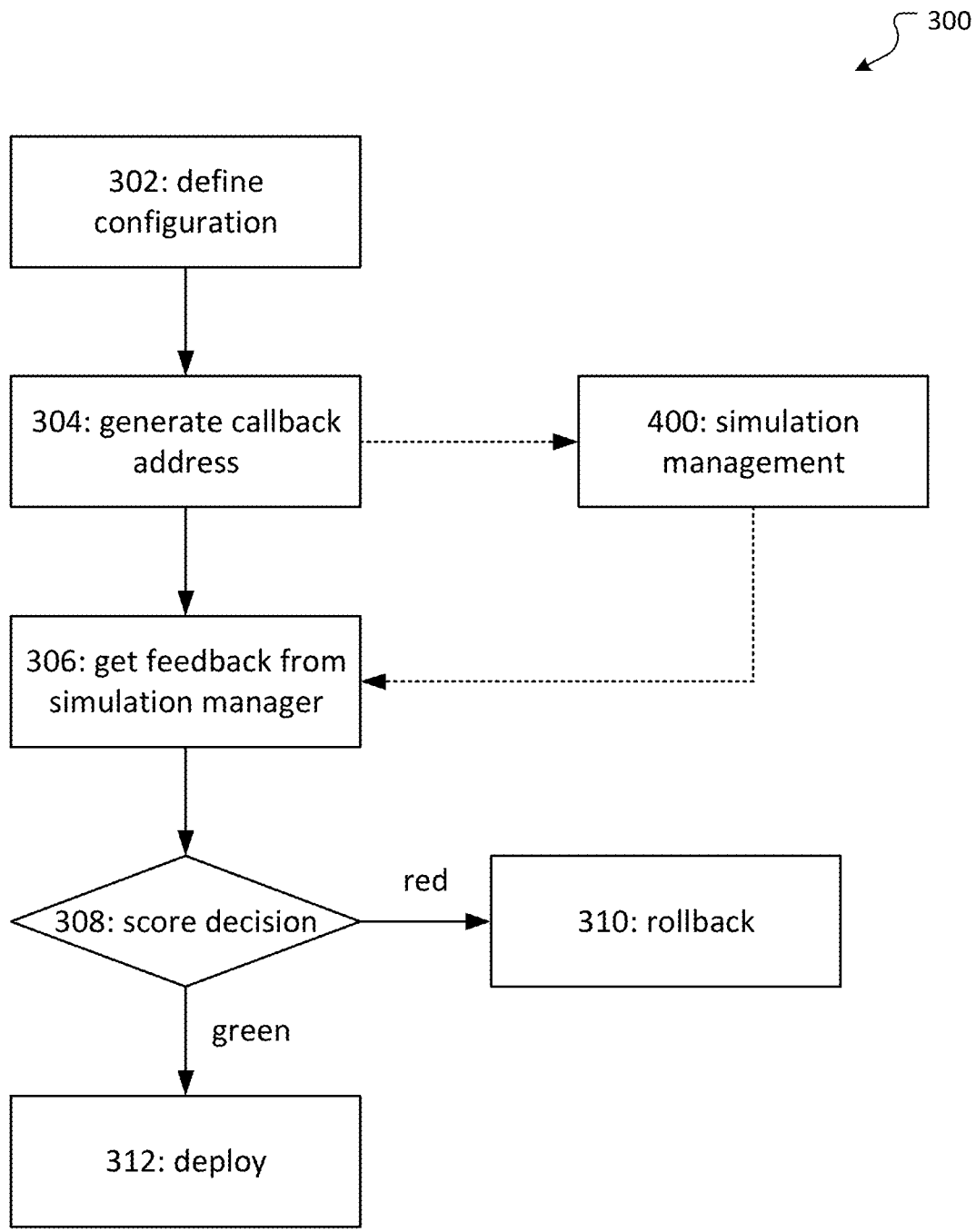
FIG. 3 shows a callback address management process according to an embodiment of the present disclosure.

FIG. 3 shows a callback address management process 300 according to an embodiment of the present disclosure. Callback address manager 120 may perform process 300 to connect a thorough review of code (e.g., performed by simulation manager 130 as described below) with CID pipeline 102 that releases code at high speed. Accordingly, process 300 may allow for automatic recall or expanded rollout of the code, depending on the code review outcome, in a reliable manner without human intervention.

At 302, callback address manager 120 may define a configuration for the code test. For example, callback address manager 120 may define a set of metrics to be tested (e.g., client and/or backend metrics) and/or service level requirements for each metric (e.g., red (fail), green (pass), and yellow (pass with flag) result ranges). The defined configuration may include key performance indicators (e.g., metric names, metric test parameters, and/or units of measure), query strings for making API calls to monitoring sources, and/or score ranges for service levels. Any metrics and/or tests may be defined, but some non-limiting examples may include metrics and/or tests for monitoring sources such as Wavefront™, Splunk™, AppDynamics™, etc. Likewise, any service level requirements may be defined, but some non-limiting examples may include a green score of less than 100, a yellow score of 100-500, and/or a red score of above 500.

In some embodiments, a developer user may input the definitions, for example in the form of a JavaScript object notation (JSON) file. In some embodiments, the JSON may also include and/or indicate one or more simulation scripts for use by simulation manager 130. In some embodiments, the JSON may also include and/or indicate a product release plan that may define rollout procedures in case of test success and/or a rollback plan that may define rollback procedures in case of test failure. An example JSON ("SLA.json") may appear as follows:

"metrics": {
"splunk":[ ],
"app_dynamics":[ ],
"wavefront":[
{
"query_str": "'"rate(sum(ts("collectd.Generic JMX.counter-kafka-connect.bytes-read.idea-link-risk-v2" and app=dl and env=${env} and location=us-west-2)))"'",
"unit":"Bytes/sec to S3",
"desc":"Bytes/sec to S3",
"string_tag":"Bytes-Per-Sec-To-S3",
"category":"S3",
"sla_range":[100,500]
},
..
},
"workload_simulator_inputs":{
"sythetic_user_scenario_script":
https://github.developer.com/data-eventbus/kafka-gatling/blob/master/src/test/scala/com/kafka/KafkaProducerSimulationNo Encrypt.scala",

```
"exit_criteria":[
{
"init_workload_tps":100,
"max_target_workload_tps":20000,
}
..
}
```

The scores may represent classification labels (e.g., green, yellow, red) for an aggregate statistic for time series samples for a metric data set for the duration of an observation period. Examples of aggregate statistics may include, but are not limited to, max, mean, median, 90th percentile, 99th percentile, etc.

For example, a JSON file may include a defined set of metrics deemed necessary for qualifying application performance. The metrics may span the full stack for the application (frontend to backend). In a specific, non-limiting sample machine learning platform application, key metrics may be as follows:

Frontend:
    Client Response Time
    Client Error Rate
    APIGW (API Gateway) Response Time Backend (application service or system metrics):
    App server CPU Utilization
    App server Memory Utilization
    App server Disc I/O
    App server Service Response Time At 304, callback address manager 120 may generate a callback address for simulation manager 130 to use when reporting results. In some embodiments, simulation manager 130 may be configured to perform tests on many different pipelines 102, and accordingly may need information telling it where to report when tests are completed. For example, the callback address may be a dynamic address such as a URL that may be generated for the specific pipeline 102 being tested. Callback address manager 120 may perform an asynchronous handoff of the JSON and callback address to simulation manager 130, and simulation manager 130 may perform process 400 as described below to test the code in response.

At 306, callback address manager 120 may listen for and receive feedback from simulation manager 130. For example, callback address manager 120 may detect a response sent to the callback address generated at 304. Because the processing may be asynchronous, the response may be detected at any time, including after users have started using the code deployed through pipeline 102. In many cases, the response may be detected several hours after the handoff to simulation manager 130 depending on the time it takes to complete testing.

At 308, callback address manager 120 may examine the response to determine the score decision rendered by simulation manager 130. For example, as described below with respect to FIG. 4, the score may be red, indicating that the code failed, or green, indicating that the code passed.

If the score is red, at 310, callback address manager 120 may perform a rollback procedure for the code deployed by pipeline 102. Because callback address manager 120 may be integrated into CID system 100 as noted above, callback address manager 120 may be able to automatically roll back the failed code. The rollback procedure may include, for example, setting a flag to disable the feature provided by the code within the product, updating the pipeline 102 state to indicate code failure and/or to revert the code back to an earlier version, and/or notifying one or more development team members by one or more alert methods (e.g., post in developer chat service, text message, email, etc.) so that the code may be fixed (e.g., including providing a description of the problem and the affected code in some embodiments).

If the score is green, at 312, callback address manager 120 may perform a deployment procedure for the code deployed by pipeline 102. As the code may already be deployed, this procedure may include deploying the code to a larger group of customers if applicable. In either case, the deployment procedure may include updating he pipeline 102 state to indicate code success and/or notifying one or more development team members by one or more alert methods (e.g., post in developer chat service, text message, email, etc.) of the code success.

Figure 4:
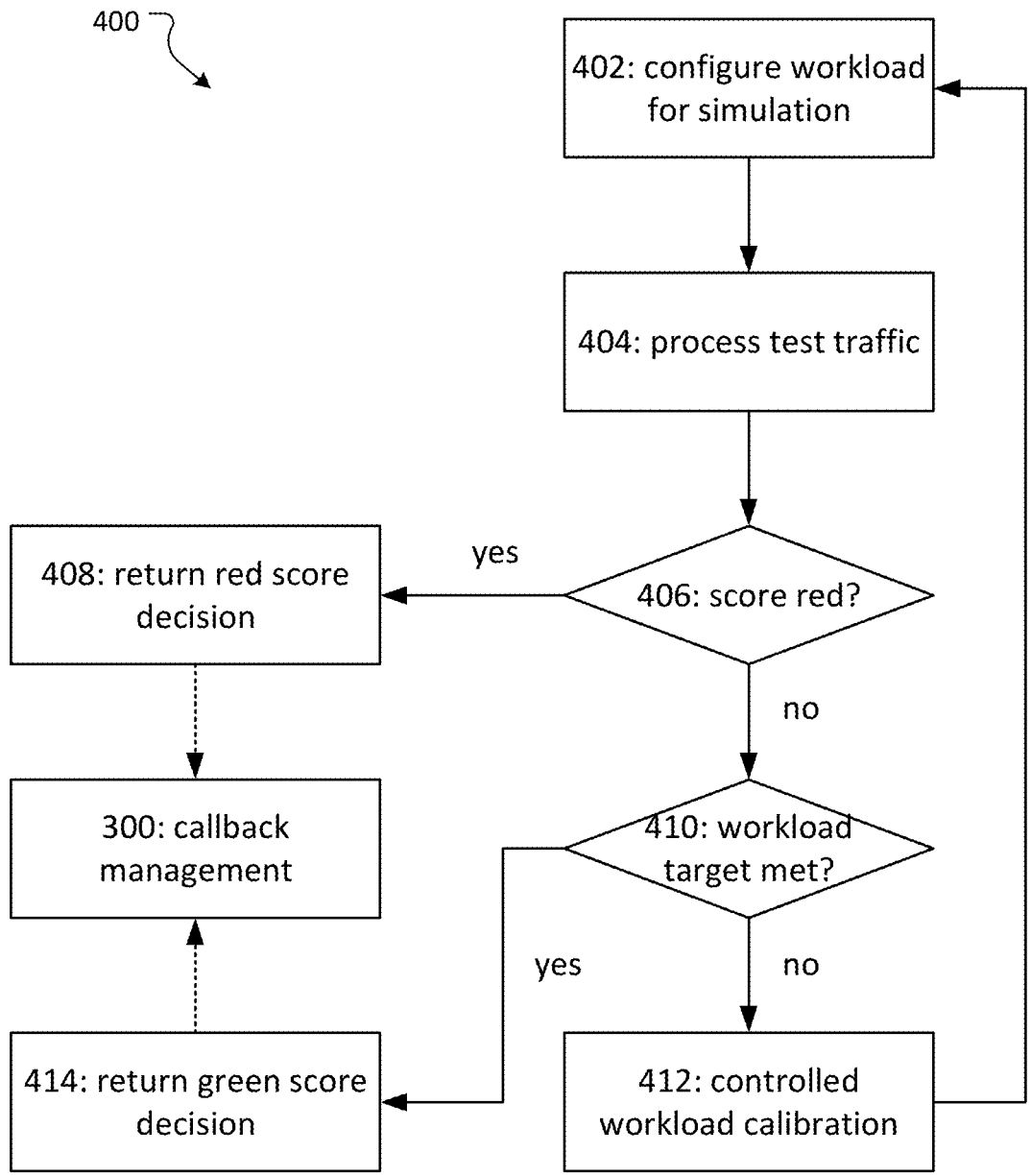
FIG. 4 shows a simulation management process according to an embodiment of the present disclosure.

FIG. 4 shows a simulation management process 400 according to an embodiment of the present disclosure. Simulation manager 130 may perform process 400 to automatically perform asynchronous code testing that may allow automatic code recall after deployment (e.g., by process 300 as described above). Process 400 may begin for a given code set when simulation manager 130 receives enabling data (e.g., the address and JSON sent at 304 of process 300) from callback address manager 120.

At 402, simulation manager 130 may configure a workload for simulation for the code testing. In order to test code for performance and/or reliability, simulation manager 130 may subject the code to a workload of simulated user interaction and/or network data traffic to detect performance issues and/or bugs affecting reliability. Accordingly, simulation orchestrator 132 may assemble a set of workload data to input to the code for the simulation. Simulation orchestrator 132 may obtain real-world workload data from the deployed code and use this data as simulation input and/or simulation orchestrator 132 may generate synthetic user workload data as simulation input. In some embodiments, simulation orchestrator 132 may start with real-world data and augment with synthetic data only when workload targets are not met by the real-world data, as described below. Simulation orchestrator 132 may start with a relatively low workload, such as 100 transactions per second (TPS).

At 404, simulation manager 130 may process the test traffic generated at 402. For example, score collector/processor 134 may input the workload data into the code and record the output of the code and/or the response time of the code in generating the output. Different monitoring tools (e.g., CollectD™, CloudWatch™, App-Dynamics™, etc.) may continuously generate timeseries samples for metrics specified in the JSON.

At 406, simulation manager 130 may determine whether the score is green, yellow, or red. For example, score decision engine 136 may evaluate the code by comparing the output and/or response time to the parameters defined by the JSON. Continuing the example given above, score decision engine 136 may assign a green score for a response time of less than 100, a yellow score for a response time of 100-500, and/or a red score for a response time of above 500. Specific examples of score generation and score characteristics that may be used in some embodiments are described below with respect to scoring process 500 of FIG. 5.

To continue the example of the specific, non-limiting sample machine learning platform application discussed above with respect to FIG. 3, for a duration for observation (e.g., 20 minutes), and time slices/moving window size (e.g., 2 minutes), the continuous timeseries samples may be transformed into discrete Scoring labels (e.g., green, red, yellow)

based on scoring rules as defined in JSON files. For example, rules may be defined as follows:
s=Aggregate Statistic
   lte: less than or equal to
   gte: greater than or equal to
   between: between (not including) values x and y
$SCORE_t$: At timeslice t=classification labels (e.g., red, yellow, green) determined for time slice t.

For example, assume timeseries samples are collected every second by monitoring engines, where time slice t=2 minutes. Timeseries signals (e.g., the samples obtained every second) may be transformed into discrete classification labels (e.g., red, yellow, green) for every 2 minute timeslice. Thus, for an example number of metrics=5, and total observation window=20 minutes, there may be 10 time slices of 2 minutes each. Accordingly, a scorecard for the 20 minute observation window may include a 10×5 (for 5 metrics) grid of score labels such as the following:
Frontend:
   Client Response Time (s: 90-Percentile, GREEN: s lte 300, YELLOW: s between 300 and 800, RED: s gte 800)
   Client Error Rate (s: Mean, GREEN: s lte 5, YELLOW: s between 5 and 15, RED: s gte 15)
   APIGW Response Time (s: 90-Percentile, GREEN: s lte 400, YELLOW: s between 400 and 800, RED: s gte 100)
Backend (application service or system metrics):
   App server CPU % Utilization (s: Max, GREEN: s lte 20, YELLOW: s between 20 and 40, RED: s gte 40)
   App server % Memory Utilization (s: Max, GREEN: s lte 25, YELLOW: s between 25 and 45, RED: s gte 45)
   App server Disc I/O-% Disc Space Available (s: Max, GREEN: s gte 50, YELLOW: s between 20 and 50, RED: s lte 20).

If the score is red, at 408, score decision engine 136 may return a red score. Simulation manager 130 may report the red score to the dynamic address provided by callback address manager 120 for use in process 300 as described above, for example.

If the score is not red, at 410, simulation manager 130 may determine whether a target workload has been met for the code. In some embodiments, a target workload may be specified in the JSON, and may be significantly higher that the initial workload (e.g., a target workload of 20,000 TPS).

If the target workload has not been met, at 412, simulation orchestrator 132 may perform a controlled workload calibration. This calibration may include incrementally increasing the workload by an interval or a sequence (e.g., Fibonacci sequence). For example, the workload may be increased to 400 TPS for 15 minutes. After the workload is increased, process 400 may resume at 402 to gather the workload data and proceed to test the traffic at 404 and score the performance at 406. If the code continues to pass, workload targets may be sequentially increased (e.g., 900 TPS for 15 minutes, 1900 TPS for 15 minutes, 4000 TPS for 15 minutes, 8000 TPS for 15 minutes, and so on until 20000 TPS for 15 minutes is reached) until either a red score is identified at 406 or the workload target is met at 410.

If the workload target is met with a green score, at 414, score decision engine 136 may return a green score. Simulation manager 130 may report the green score to the dynamic address provided by callback address manager 120 for use in process 300 as described above, for example.

Figure 5A:
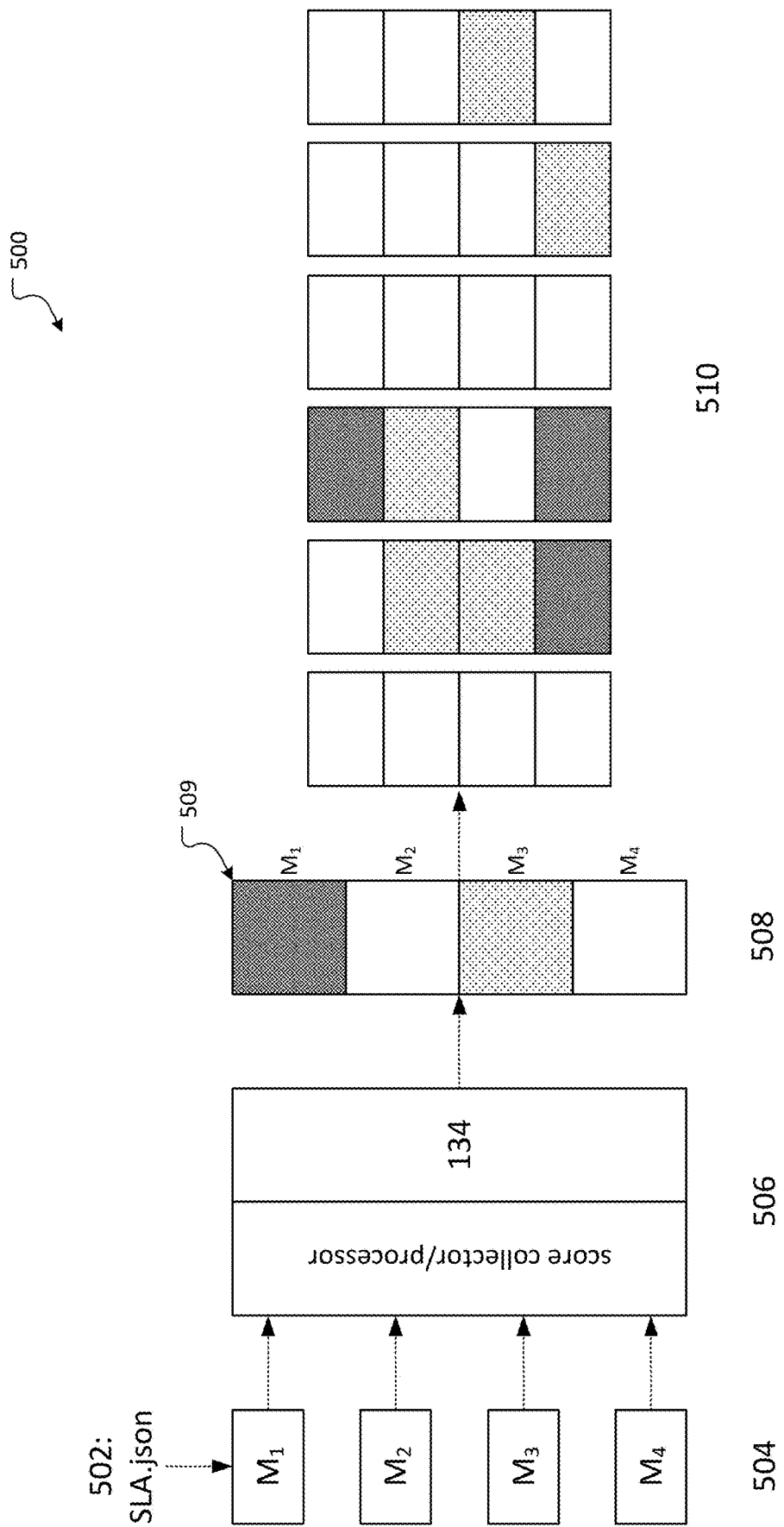
FIGS. 5A-5B show a scoring process according to an embodiment of the present disclosure.
Figure 5B:
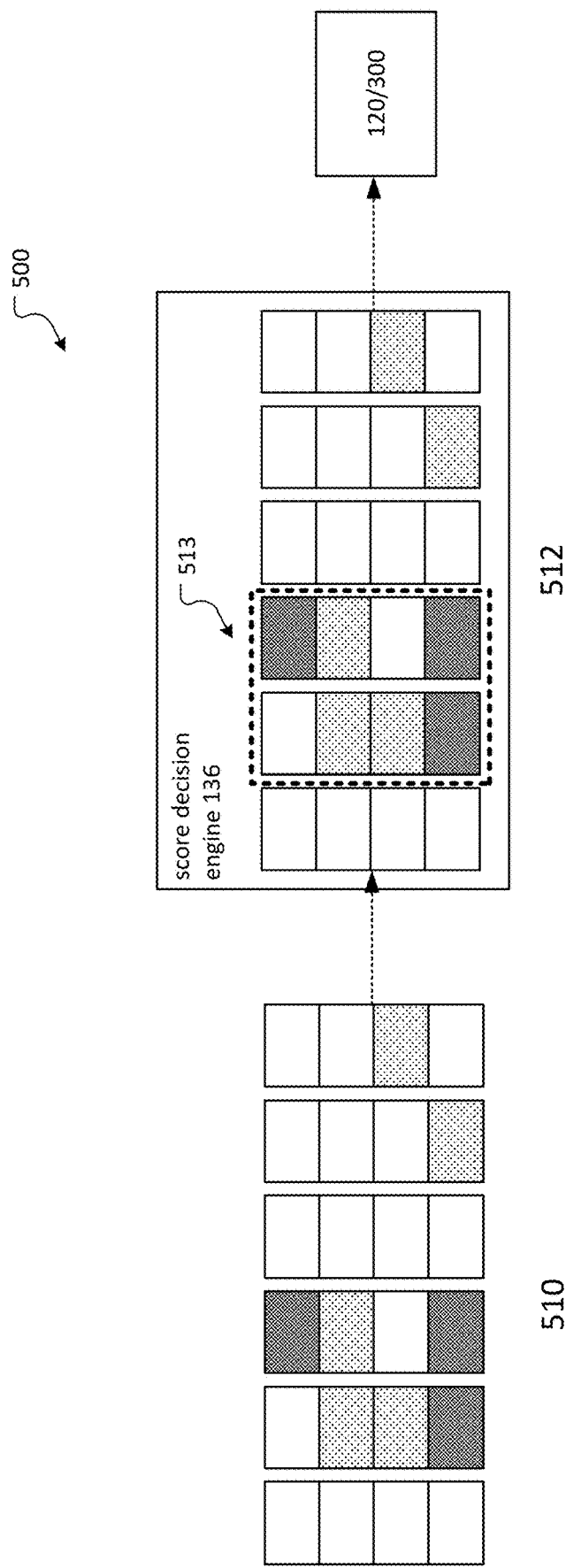

FIGS. 5A-5B show a scoring process 500 according to an embodiment of the present disclosure. Simulation manager 130 may perform scoring process 500 as part of simulation management process 400, for example as part of the testing at 404 and/or score determination at 406. Note that while the example scoring in process 500 may identify specific code as having specific red, green, or yellow scores, these scores are presented as examples only, and process 500 may be applied to any code to generate any score.

At 502, simulation manager 130 may load the code test configuration from the JSON provided by callback address manager 120. For example, simulation manager 130 may set key performance indicators for the test and their respective service level requirements ("metrics") and/or monitoring sources to use (e.g., including establishing query strings for making API calls) according to the information in the JSON. Simulation manager 130 may also set a moving window size for test samples. The moving window size may be used to segment continuously input test data into chunks that may be analyzed and scored, as described below. The test may include one or more metrics and may use one or more monitoring sources to gather test data.

Any metrics may be tested, such as, but not limited to, the following examples: end user response time (in milliseconds), APIGW response time (in milliseconds), core app server response time (in milliseconds), model (e.g., AWS Sagemaker™) hosting response time (in milliseconds), core CPU utilization average (in %), core memory utilization average (in %), and/or core disk I/O available disk space (in %).

At 504, simulation manager 130 may receive time series data from the monitoring sources. In this example, four sets of time series data (e.g., $M_1$, $M_2$, $M_3$, $M_4$) are shown, but any number of sets may be gathered. Each set of time series data may be associated with a separate metric and/or may be from a specific source or sources. For example, $M_1$ may include data gathered from Wavefront™, $M_2$ may include data gathered from Splunk™, etc. The monitoring sources themselves may have capabilities to gather the requested metrics. The time series data may be gathered continuously during a testing period and fed into score collector/processor 134.

At 506, simulation manager 130 may segment the time series data according to the moving window size and may score the segmented data. For example, score collector/processor 134 may define a plurality of windows in time having the size specified by the JSON (e.g., 5 minutes, 10 minutes, or any other size). For each window, score collector/processor may convert the time series data gathered during that window into quantized chunks corresponding to the window size. Score collector/processor 134 may separately score each chunk according to the metrics defined by the JSON, yielding a red, green, or yellow score for each chunk.

At 508, simulation manager 130 may produce a score card for each moving window. One score card 509 for one window is shown, but score collector/processor 134 may continuously produce score cards 509 as more data comes in at 504 and is segmented and scored at 506. Score card 509 may include a complete set of scores for all metrics for a given window. In FIG. 5, unshaded segments of score card 509 are green (e.g., the segments for $M_2$ and $M_4$), lightly shaded segments are yellow (e.g., the segment for $M_3$), and darkly shaded segments are red (e.g., the segment for $M_1$). As data comes in and scores are generated, score collector/processor 134 may accumulate a plurality of score cards 509 for the test.

At 510, simulation manager 130 may complete a full set of score cards 509 for the test. For example, assume the window size is 10 minutes, and the test is a 60 minute test. In this example, score collector/processor 134 may generate a set of six score cards 509 (e.g., one for each 10 minute window) as shown at 510, with each metric receiving a separate score in each score card 509.

At 512, simulation manager 130 may determine a score decision for the test. For example, score decision engine 136 may use one or more machine learning algorithms or other techniques to identify "hotspots" or areas where yellow and/or red scores are clustered. In some embodiments, score decision engine 136 may start the score decision determination by normalizing the scores of each segment of each score card 509, for example to a 0-1 scale with 0 being a lowest (green) score and 1 being a highest (red) score. In other embodiments, all metrics may use the same scale and score decision engine 136 may not need to normalize. In some embodiments, score decision engine 136 may use scikit-learn preprocessing libraries to perform the normalizing.

Score decision engine 136 may use the normalized (or otherwise similarly scaled) score data as inputs to one or more machine learning algorithms to identify hotspots. For example, hotspots may be clusters of red scores or red and yellow scores within a set of score cards 509 for a test. For example, score decision engine 136 may perform k-means clustering on the set of score cards 509 in some embodiments. Other embodiments may use other clustering techniques, such as mean-shift, DBSCAN, expectation-maximization, hierarchical clustering, etc. In the illustrated example, the set of score cards 509 includes hotspot 513, with three red and three yellow scores out of 8 total scores in two consecutive moving windows. If score decision engine 136 finds one or more hotspots, score decision engine 136 may generate a red score decision for the test. If score decision engine 136 does not find any hotspots, score decision engine 136 may generate a green score decision for the test. As described above, simulation manager 130 may provide the decision to callback address manager 120 which may react to the decision according to process 300, for example.

Accordingly, score decision engine 136 may apply unsupervised learning to identify hotspot time windows which may qualify as presenting a risk to release. While some embodiments may use k-means clustering, some embodiments may perform unsupervised clustering using DBSCAN, a density based unsupervised clustering algorithm, which may detect the cluster based on the density (or frequency) of labels in a given distance radius. DBSCAN may utilize at least two input parameters:

$\xi$: Maximum distance (radius) to be considered as same neighborhood

Frequency (or minimum samples): f

DBSCAN may therefore identify data arranged in a scorecard as described above. A cut-off area for declaring a hotspot may be, for example, a set of contiguous time slices (scores) for a given set of metrics. For example, $\xi$ radius may be specified as 3t, so if t=1 1 minute, the span may be 3 m+3 m=6 minutes. In a 6 m radius there may be 8 metrics×6 scores=48 scores. Score decision engine 136 may specify the frequency (or minimum number of samples), such as a percentage of cells with red+yellow. For example, for every 6 minutes of tracking window, if 75% of cells (minimum 36 cells out of 48) are red or yellow, that may qualify as a hotspot in some embodiments.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A code deployment method comprising:
deploying, by a continuous integration and delivery (CID) pipeline, code in a state of incomplete testing to at least one end user in a production stage;
while the code is deployed, handing off, by a callback address manager of at least one processor in communication with the CID pipeline, the code to a simulation manager of the at least one processor;
testing, by the simulation manager, the code;
generating, by the simulation manager, a score decision based on a result of the testing;
sending, by the simulation manager, the score decision to the callback address manager; and
modifying, by the callback address manager, deployment of the code based on the score decision.

2. The method of claim 1, wherein the handing off includes sending test configuration information to the simulation manager.

3. The method of claim 2, wherein the test configuration information includes at least one of at least one test metric, at least one data source, and at least one score range.

4. The method of claim 1, wherein the handing off includes sending a callback address to the simulation manager.

5. The method of claim 4, wherein the sending of the score decision includes sending the score decision to the callback address.

6. The method of claim 1, wherein the testing includes assessing at least one metric against data from at least one data source during at least one time period to generate at least one score.

7. The method of claim 6, wherein the at least one score includes a plurality of scores, and the testing further includes identifying at least one failed cluster of scores in the plurality of scores.

8. The method of claim 7, wherein the score decision indicates a failed test based on the at least one failed cluster of scores.

9. The method of claim 8, wherein the modifying includes causing a rollback of the deployed code.

10. The method of claim 1, wherein the score decision indicates a failed test.

11. The method of claim 10, wherein the modifying includes causing a rollback of the deployed code.

12. The method of claim 1, wherein the score decision indicates a passed test.

13. The method of claim 12, wherein the modifying includes causing a deployment, by the CID pipeline, of the deployed code to at least one additional end user.

14. A code deployment system comprising:
- a continuous integration and delivery (CID) pipeline configured to deploy code in a state of incomplete testing to at least one end user in a production stage; and
- at least one processor configured to execute:
- a callback address manager in communication with the CID pipeline and configured to hand the code off to a simulation manager executed by the at least one processor while the code is deployed; and
- the simulation manager configured to test the code, generate a score decision based on a result of the testing, and send the score decision to the callback address manager; wherein
- the callback address manager is configured to modify deployment of the code based on the score decision.

15. The system of claim 14, wherein callback address manager is configured to hand the code off by a process including sending test configuration information to the simulation manager.

16. The system of claim 14, wherein the test configuration information includes at least one of at least one test metric, at least one data source, and at least one score range.

17. The system of claim 14, wherein callback address manager is configured to hand the code off by a process including sending a callback address to the simulation manager.

18. The system of claim 17, wherein the simulation manager is configured to send the score decision to the callback address.

19. The system of claim 14, wherein the simulation manager is configured to test the code by a process including assessing at least one metric against data from at least one data source during at least one time period to generate at least one score.

20. The system of claim 19, wherein the at least one score includes a plurality of scores, and the process by which the simulation manager is configured to test the code further includes identifying at least one failed cluster of scores in the plurality of scores.

21. The system of claim 20, wherein the score decision indicates a failed test based on the at least one failed cluster of scores.

22. The system of claim 21, wherein the callback address manager is configured to modify deployment of the code by causing a rollback of the deployed code.

23. The system of claim 14, wherein the score decision indicates a failed test.

24. The method of claim 10, wherein the callback address manager is configured to modify deployment of the code by causing a rollback of the deployed code.

25. The system of claim 14, wherein the score decision indicates a passed test.

26. The method of claim 12, wherein the callback address manager is configured to modify deployment of the code by causing a deployment, by the continuous integration and delivery (CID) pipeline, of the deployed code to at least one additional end user.

* * * * *